(12) United States Patent
Kral

(10) Patent No.: US 10,031,835 B2
(45) Date of Patent: Jul. 24, 2018

(54) CODE BLOCK RATING FOR GUILTY CHANGELIST IDENTIFICATION AND TEST SCRIPT SUGGESTION

(71) Applicant: SAP SE, Walldorf (DE)

(72) Inventor: Vladimir Kral, Bratislava (SK)

(73) Assignee: SAP SE, Walldorf (DE)

( * ) Notice: Subject to any disclaimer, the term of this patent is extended or adjusted under 35 U.S.C. 154(b) by 127 days.

(21) Appl. No.: 15/279,109

(22) Filed: Sep. 28, 2016

(65) Prior Publication Data

US 2018/0089063 A1 Mar. 29, 2018

(51) Int. Cl.
G06F 11/36 (2006.01)

(52) U.S. Cl.
CPC ...... G06F 11/3648 (2013.01); G06F 11/3688 (2013.01)

(58) Field of Classification Search
CPC ............. G06F 11/3648; G06F 11/3688; G06F 17/30867; G06F 17/3089
See application file for complete search history.

(56) References Cited

U.S. PATENT DOCUMENTS

| | | | |
|---|---|---|---|
| 9,176,731 B1* | 11/2015 | Ziftci | G06F 8/73 |
| 2005/0015675 A1* | 1/2005 | Kolawa | G06F 11/3688 |
| | | | 714/38.14 |
| 2013/0311481 A1* | 11/2013 | Bhat | G06F 17/30321 |
| | | | 707/741 |

* cited by examiner

*Primary Examiner* — Jigar Patel
(74) *Attorney, Agent, or Firm* — Sterne, Kessler, Goldstein & Fox P.L.L.C.

(57) ABSTRACT

Code block rating for guilty changelist identification and test script suggestion is discussed herein. An embodiment operates by assigning, by at least one processor, a respective code block rating to each code block of a plurality of code blocks; determining, by at least one processor, a change list rating for a change list, wherein the determining comprises: assigning, by at least one processor, a respective suspicious code block rating to each code block of the plurality of the code blocks modified by the change list, wherein the respective suspicious code block rating of a code block is based upon the respective code block rating of the code block, and calculating, by at least one processor, the change list rating based upon the respective code block ratings of each code block modified by the change list; and performing, by at least one processor, maintenance on the change list based upon the calculated change list rating.

18 Claims, 6 Drawing Sheets

CODE BLOCK RATING FOR GUILTY CHANGELIST IDENTIFICATION AND TEST SCRIPT SUGGESTION

BACKGROUND

To ensure proper functionality of every released patch or version of a computer program product, it is common to use automated test scripts—for example, unit tests, integration tests, full system tests, etc.—to verify that the newly submitted code changes do not break functionality of previous patches or versions. These test scripts often require many computer resources, causing a strain on the system if all tests scripts are run after a change list is created. Current systems do not allow for the identification of test scripts that may best test the implemented changes. Without this identification, systems must run more test scripts than needed, causing strain on the system.

Further, a change of a single code block may cause the failure of one or multiple test scripts. After these tests scripts have failed and the results are analyzed, test scripts that fail for the same reason are grouped together as duplicates. Such a system causes difficulty in identifying the change list that may have caused the test scripts to fail. This leads to a strain on the system as all change lists must be tested to determine which change list caused the failure.

BRIEF DESCRIPTION OF THE DRAWINGS

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, method and/or computer program product embodiments, and/or combinations and sub-combinations thereof, for sensory detection of interactions during broadcast content.

Figure 1:
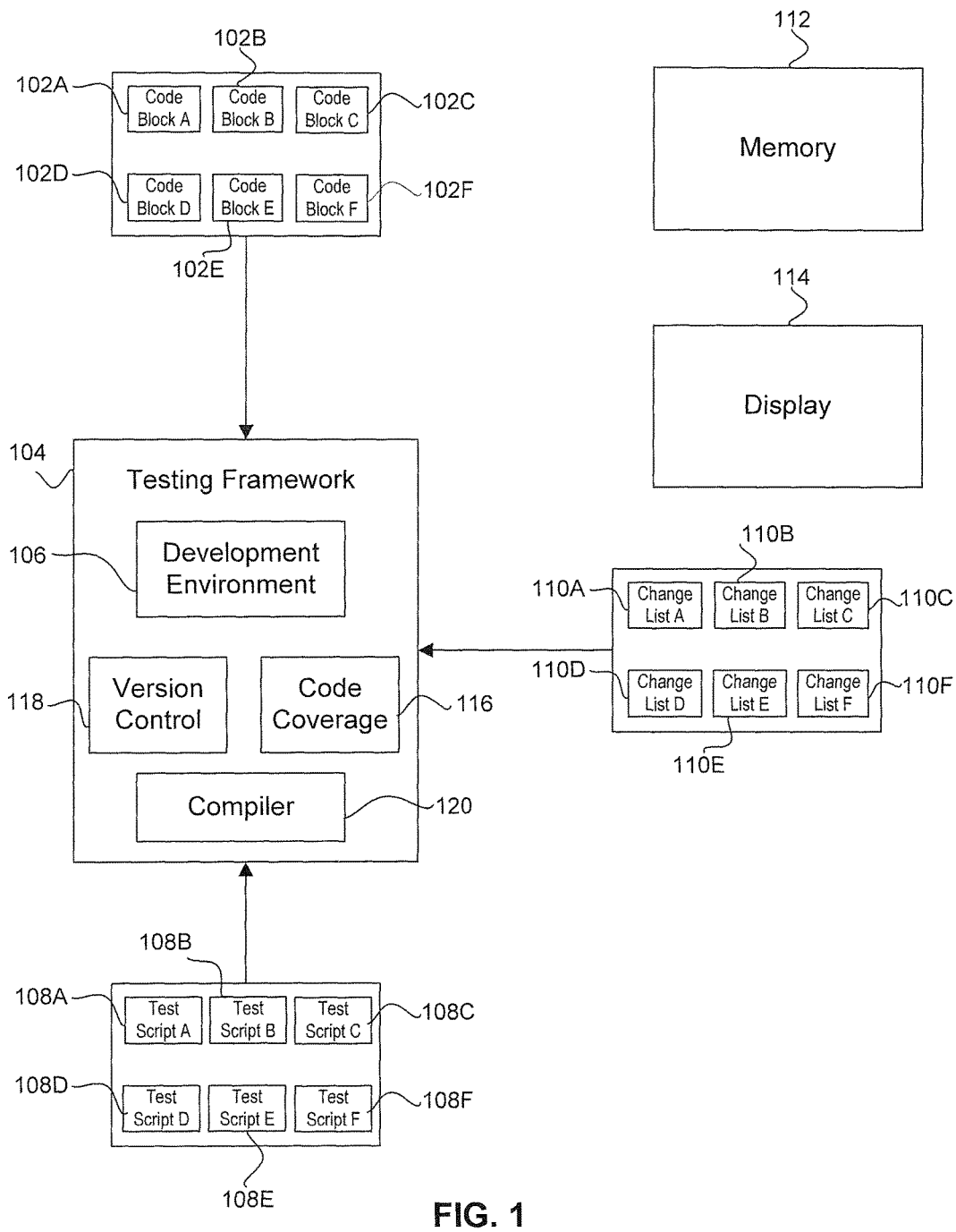
FIG. 1 is a block diagram of a system for code block and test script suggestion, according to some embodiments.

FIG. 1 is a block diagram of a system for code block and test script suggestion, according to some embodiments. According to an embodiment, the system for code block and test script suggestion 100 may comprise a plurality of code blocks 102 (comprising code block A 102A, code block B 102B, code block C 102C, code block D 102D, code block E 102E, and code block F 102F), testing framework 104, development environment 106, a plurality of test scripts 108 (comprising test script A 108A, test script B 108B, test script C 108C, test script D 108D, test script E 102E, and test script F 102F), a plurality of change lists 110 (comprising change list A 110A, change list B 110B, change list C 110C, change list D 110D, change list E 110E, and change list F 110F), memory 112, code coverage 116, version control 118, and compiler 120.

In an embodiment, a code block of code blocks 102 may comprise sections of code grouped together. For example, a code block may comprise one or more declarations or statements. According to an embodiment, a code block may comprise any computer-readable programming language, such as, for example, SQL, C, C++, Python, Java, Fortran, or any combination thereof to name a few. In an embodiment, code blocks 102 may be stored in memory 112. Memory 112 may comprise random access memory (RAM), read-only memory (ROM), electronically erasable programmable random access memory (EEPROM), hard disk drive (HDD), solid state drive (SSD), or any combination thereof to name a few examples.

According to an embodiment, each code block of code blocks 102 may be modified by development environment 106. Development environment 106 may comprise a computer program product, mobile device, program, application, processor—or any combination thereof—allowing for the creation and edit of code blocks. In an embodiment, development environment 106 may receive a modification input. The modification input may comprise data identifying code blocks of code blocks 102 to modify and modifications to the code of the identified code blocks. According to an embodiment, the modification input may be received as strokes on a keyboard, swipes on a touch screen, mouse clicks, mouse drags, text, a file, or any combination thereof to name a few examples. In an embodiment, development environment 106 may modify code blocks 102 according to the modification input received. For example, development environment 106 may receive a modification input comprising data for the code of code block A 102A to be modified. Development environment 106 may then modify the code of code block A 102A according to the modification input.

In an embodiment, when development environment 106 has completed modifying code blocks 102 according to a modification input, version control 118 may commit the changes. Version control 118 may comprise a computer program product, mobile device, program, application, processor—or any combination thereof—allowing generated or edited code to be committed. According to an embodiment, committing the changes may comprise generating a change list. A change list may comprise data identifying the set of changes made to code blocks 102 when version control 118 commits modification to the code of code blocks 102. For example, development environment 106 may modify the code of code block A 102A, code block C 102C, and code block D 102 D according to a modification input received. Version control 118 may then commit the modification to the code of code block A 102A, code block C 102C, and code block D 102D and generate change list A 110A. Change list A 110 A may then comprise data identifying the modification made to the code of code block A 102A, code block C 102C, and code block D 102D.

According to an embodiment, change lists 110 generated by version control 118 may be stored in memory 112.

According to an embodiment, compiler 120 may compile code blocks 102 into software, programs, applications, or any combination thereof (compiled code), to name a few examples. Compiler 120 may comprise a computer program product, mobile device, program, application, processor—or any combination thereof—allowing for the compiling of code blocks.

In an embodiment, testing framework 104 may run test scripts 108 on compiled code compiled from blocks 102. Test scripts 108 may comprise a set of instructions to be performed on code compiled from code blocks 102 to test that the compiled code is functioning as expected. Test scripts 108 may further comprise data identifying the compiled code for which the set of instructions are to be performed. For example, test script A 108A may comprise a set of instructions to test compiled code, compiled from code block B 102B, code block D 102D, and code block E 102 E, is functioning properly. According to an embodiment, test scripts 108 may be stored in memory 114.

According to an embodiment, testing framework 104 may receive a testing input. The testing input may comprise data identifying what test scripts to run. For example, testing framework 104 may receive a testing input comprising that test script A 108A, test script C 108C, and test script D 108D are to be run. In to an embodiment, the testing input may be received as strokes on a keyboard, swipes on a touch screen, mouse clicks, mouse drags, text, a file, or any combination thereof—to name a few examples.

In an embodiment, once testing framework 104 has run test scripts from test scripts 108, testing framework 104 may detect that compiled code is not functioning properly (malfunctioning). For example, testing framework 104 may run test script A 108A, comprising a set of instructions for compiled code compiled from block A 102A and block C 102C, test script C 108C, comprising a set of instructions for compiled code compiled from block B 102B and block C 102C, and test script D 108D, comprising a set of instructions for compiled code compiled from code block B 102B and code block E 102E. After the test scripts are run, testing framework 104 may, for example, detect that the compiled code compiled from code block B 102B and code block C 102C is not functioning properly.

Figure 2:
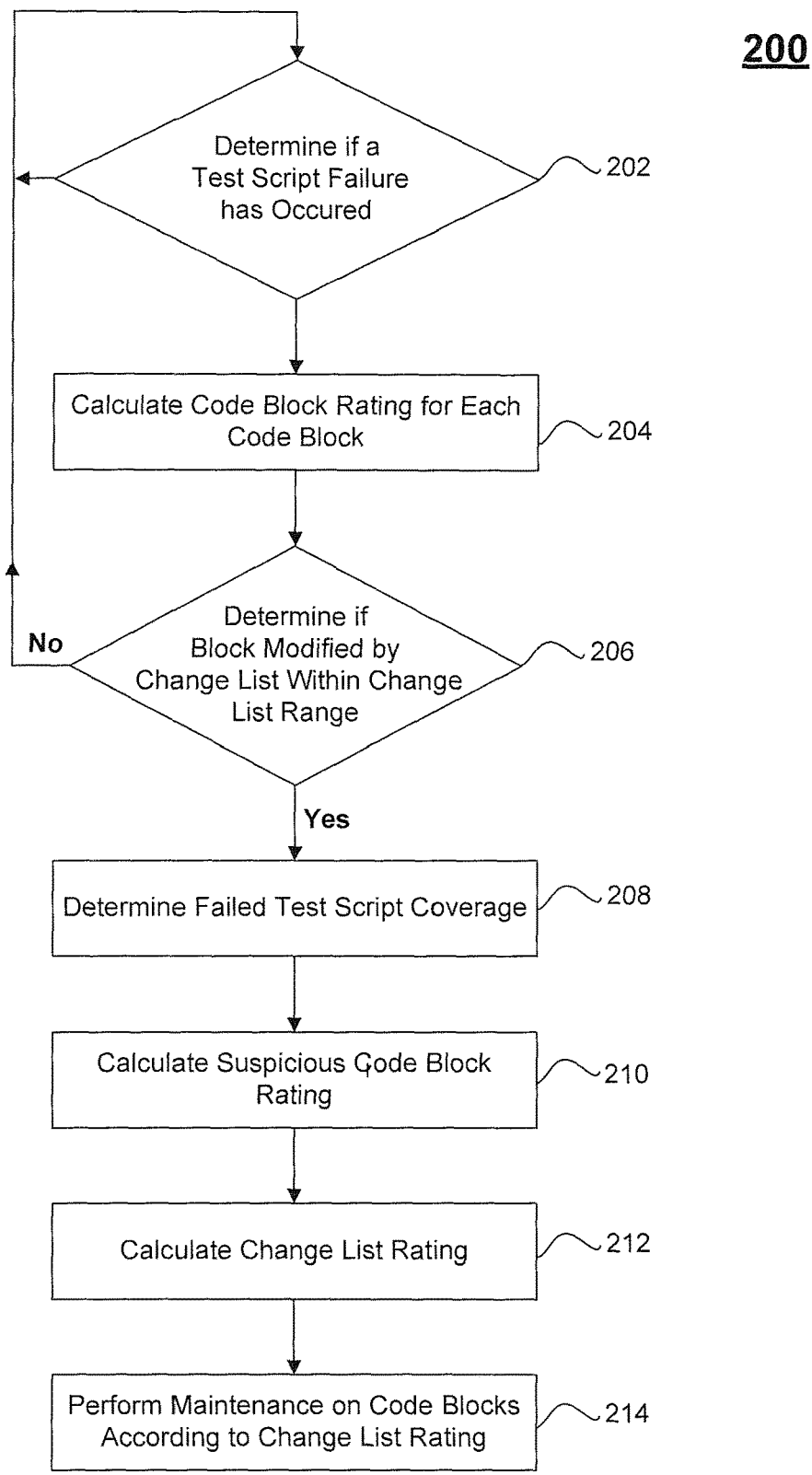
FIG. 2 is a flowchart illustrating a process for change list debugging suggestion, according to some embodiments.

According to an embodiment, code coverage 116 may analyze the compiled code that is not functioning properly and determine a guilty change list, as detailed in FIG. 2. The guilty change list may comprise a change list of change lists 110 most likely to cause compiled code compiled from code blocks 102 to not function properly according to the analysis by code coverage 116. In an embodiment, after code coverage 116 has determined a guilty change list, the guilty change list may be displayed on display 114.

Figure 3:
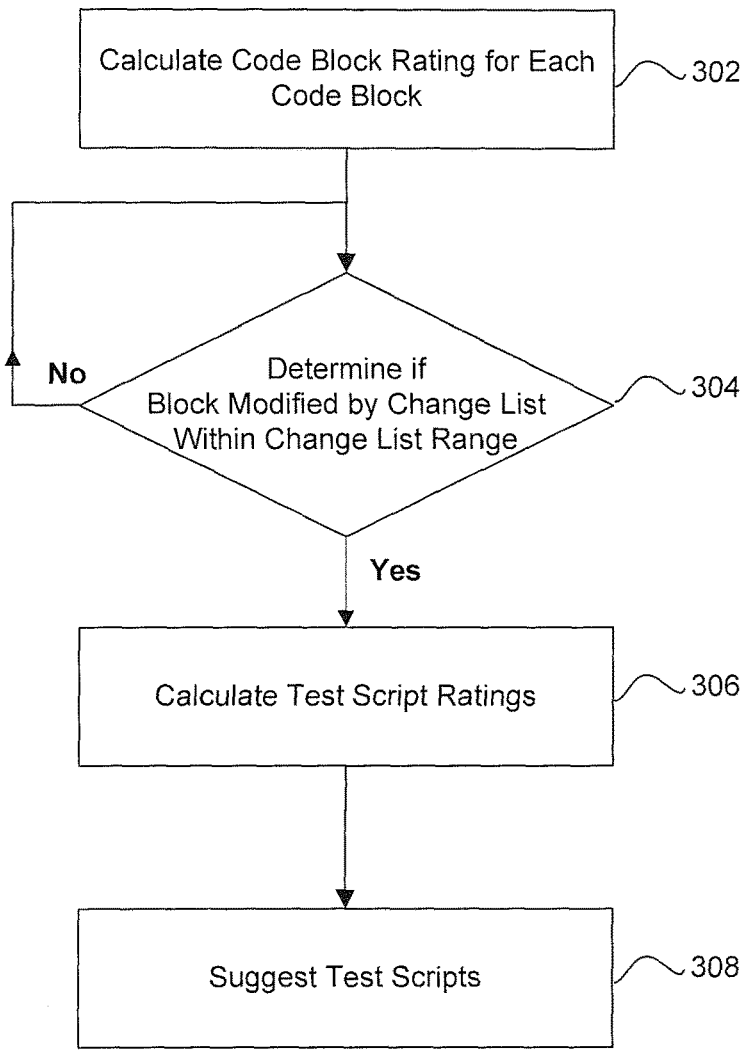
FIG. 3 is a flowchart illustrating a process for test script suggestion, according to some embodiments.

In another embodiment, code coverage 116 may analyze code compiled from code blocks 102, test scripts 108, and change lists 110 and determine a suggested test script, as detailed in FIG. 3. The suggested test script may comprise a test script that covers the modifications made by change lists 110 according to the analysis by code coverage 116. According to an embodiment, after code coverage 116 has determined a suggest test script, the suggested test script may be displayed on display 114.

FIG. 2 is a flowchart illustrating a process for change list debugging suggestion, according to some embodiments.

According to an embodiment, at 202, testing framework 104 may receive a testing input. In an embodiment, after receiving a testing input, testing framework 104 may run test scripts according to the testing input. For example, testing framework 104 may receive a testing input comprising data identifying test script A 108A, test script C 108C, and test script E 102E are to be run. Testing framework 104 may then run test script A 108A, test script C 108C, and test script E 102E.

In an embodiment, once testing framework 104 has run test scripts 108 according to a testing input, testing framework 104 may determine if any compiled code is not functioning properly. For example, after running test script A 108A, test script C 108C, and test script E 102E, testing framework 104 may determine that compiled code compiled from code block B 102B, code block D 102D, and code block F 102E is not functioning properly. If testing framework 104 detects that compiled code is not functioning properly, the system may move to 204, otherwise 202 is repeated.

According to an embodiment, at 204, code coverage 116 may determine a Code Block Rating (CBR) for each code block of code blocks 102. In an embodiment, the CBR may be determined by the following equation:

$$CBR=(1/(\text{Number of test scripts covering compiled code compiled from the code block}))  \quad [EQ1]$$

For example, test scripts 108 may comprise test script A 108A (comprising a set of instructions for block A 102A and block D 102D), test script B 108B (comprising a set of instructions for block B 102B), test script C 108C (comprising a set of instructions for block D 102D and block F 102F), test script D 108D (comprising a set of instructions for compiled code compiled from block E 102E), test script E 108E (comprising a set of instructions for compiled code compiled block A 102A and block B 102B), and test script F 102F (comprising a set of instructions for compiled code from block A 102A, block C 102C, and block D 102D). From this, code compiled from block B 102B would be covered by test script B 108B and test script E 108E. Code coverage 116 may then determine a CBR for block B 102B of (½) or 0.5.

In an embodiment, at 206, code coverage 116 may receive a change list range input. The change list range input may comprise data identifying change lists from change lists 110 to create a change list range. For example, code coverage 116 may receive a change list range input comprising data identifying change list B 110B and change list E 110E, creating a change list range from change list B 110B to change list E 110E (i.e. a range comprising change list B 110B, change list C 110C, change list D 110D, and change list E 110E).

According to an embodiment, code coverage 116 may determine which of the code blocks compiled into malfunctioning compiled code were modified by change lists falling within the change list range. In an embodiment, when code coverage 116 determines that a code block compiled into malfunctioning compiled code was modified by a change list falling within the change list range, data identifying the code block may be added to a changed code block list. The changed code block list may comprise data identifying the code blocks used to compile the malfunctioning compiled code modified by change lists within the change list range and the malfunctioning code blocks' CBRs.

For example, testing framework 104 may determine that compiled code compiled from code block B 102B and code block C 102C is not operating properly. Code Coverage 116 may then receive a change list range input comprising data identifying change list C 110C (comprising changes to code block B 102B) and change list D 110D (comprising changes to code block D 102D), creating a change list range from change list C 110C to change list D 110D. Code coverage 116 may then determine that code block B 102B was modified by a change list falling within the change list range (change list C 110C). Code coverage 116 may then add data identifying code block B 102B and code block B's 102B CBR to the changed code block list.

In an embodiment, if code coverage 116 determines that a code block compiled into malfunctioning compiled code was modified by a change list within the change list range, then the system may move to 208, otherwise 202 is repeated.

According to an embodiment, at 208, testing framework 104 may determine which of the test scripts have failed, and thus detect what compiled code is not functioning properly.

For example, testing framework 104 may run test script A 108A (comprising a set of instructions for compiled code compiled from code block A 102A and code block D 102D) which results in a failure (i.e., the compiled code is not operating properly) and test script E 108E (comprising a set of instructions for compiled code compiled from code block A 102A and code block B 102B) which results in a failure. In an embodiment, testing framework 104 may record how many of the run test scripts failed in a test list. The test list may comprise data identifying the code blocks compiled into compiled code and the number of run test scripts that detected the compiled code was not functioning properly. For example, testing framework 104 may run test script B 108B and test script E 108E that both fail and detect that code compiled from code block B 102B is not operating properly. Testing framework 104 may then add data identifying two test scripts detected that code compiled from code block B 102 is not operating properly in a test list.

In an embodiment, at 210, code coverage 106 may determine a suspicious code block rating (SCBR) for each code block compiled into malfunctioning compiled code. According to an embodiment, the SCBR may be determined by the following equation:

SCBR=CBR*(the number of test scripts that detected the compiled code compiled from the code block to not operating properly)   [EQ2]

For example, testing framework 104 may run test script B 108B and test script C 108C, both of which may detect that compiled code compiled from code block D 102D is not operating properly. Code coverage 116 may then determine that code block D 102D has a CBR of ½ or 0.5. Code coverage 116 may further determine code block D's 102D SCBR to be the number of test scripts that detected that compiled code compiled from code block D 102D is not operating properly (2 test scripts) multiplied by code block D's 102D CBR (0.5), to determine a SCBR for code block D 102D of 1.

According to an embodiment, at 212, code coverage 116 may determine a change list rating (CLR) for each of change lists 110 falling within the change list range. In an embodiment, the CLR may be determined by the following equation:

CLR=Σ(SCBR of each block modified by the change list)   [EQ3]

For example, code coverage 116 may determine a SCBR for code block A 102A of 0.7, a SCBR for code block C 102C of 1, and a SCBR for code block E 102 E of 0.3, wherein code block A 102A, code block C 102C, and code block E 102 have all been modified by change list B 110B. Code coverage 116 may then determine the CLR of change list B 110B to be the sum of the code blocks' SCBRs, or 2.

In an embodiment, at 214, development environment 106 may perform maintenance on code block 102 according the SCBRs calculated for the change lists. Performing maintenance on code blocks 102 according to the calculated SCBRs may allow the system to only perform maintenance on code blocks changed by the likely, or guilty, change lists that caused compiled code compiled from the code blocks to malfunction. By only performing maintenance on code blocks changed the likely, or guilty, change lists that caused compiled code compiled from the code blocks to malfunction, less resources of a system are used than if maintenance was performed on all the code blocks, resulting in less strain on the system. Performing maintenance on the code blocks may comprise performing an inspection, running a debugger, comparing code, undoing the change list, or any combination thereof—to name a few examples. According to an embodiment, development environment 106 may perform maintenance on code blocks 102 by performing maintenance only on the code blocks changed by the change list with the greatest CLR, performing maintenance starting on the code blocks changed by the change list with the greatest CLR, performing maintenance of code blocks changed by change lists over a threshold CLR, ignoring maintenance on code blocks changed by change lists below a threshold CLR, or any combination thereof—to name a few examples.

According to an embodiment, development environment 106 may display data identifying each change list and each change list's respective CLR on display 114. The data may be displayed as a list, a table, a matrix, or any combination thereof to name a few examples.

FIG. 3 is a flowchart illustrating a process for test script suggestion, according to some embodiments.

According to an embodiment, at 302, code coverage 116 may determine the CBR for each code block of code blocks 102. In an embodiment, the CBR for each code block of code blocks 102 may be determined as detailed in FIG. 2.

In an embodiment, at 304, code coverage 116 may receive a change list range input. The change list range input may comprise data identifying change lists from change lists 110 to create a change list range. For example, code coverage 116 106 may receive a change list range input comprising data identifying change list B 110B and change list E 110E, creating a change list range from change list B 110B to change list E 110E (i.e. a range comprising change list B 110B, change list C 110C, change list D 110D, and change list E 110E).

According to an embodiment, code coverage 116 may determine which of code blocks 102 were modified by change lists falling within the change list range. In an embodiment, when code coverage 116 determines that a code block was modified by a change list falling within the change list range, data identifying that code block and the change list that modified the code block may be added to a covered code block list. The covered code block list may comprise data identifying code blocks, the respective change lists that modified those code blocks, and each code blocks respective CBR.

In an embodiment, if code coverage 116 determines a code block was modified by a change list within the change list range then the system may move to 306, otherwise 304 is repeated.

According to an embodiment, at 306, code coverage 106 may determine which test scripts of test scripts 108 cover compiled code compiled from the code blocks identified in the covered code block list. For example, test scripts 108 may comprise test script A 108A (comprising a set of instructions for compiled code compiled from code block A 102A and code block C 102C), test script B 108B (comprising a set of instructions for compiled code compiled from code block B 102B and code block C 102C), and test script C 108C (comprising a set of instructions for compiled code compiled from code block A 102A and code block D 102D). Further, the covered code block list may comprise data identifying code block B 102B and code block C 102C. From this, code coverage 116 may determine that test script B 108B covers compiled code compiled from code block B 102B and test script A 108A and test script C 108 C cover compiled code compiled from code block C 102C.

In an embodiment, code coverage 116 may determine a test script rating (TSR) for each test script that covers compiled code compiled from a code block identified in the covered code block list. According to an embodiment, the TSR of a test script may be determined by the following equation:

$$TSR = \Sigma(\text{CBR of code blocks compiled into compiled code covered by the test script and identified in the covered code block list}) \quad [EQ4]$$

For example, test scripts 108 may comprise test script A 108A (comprising a set of instructions for compiled code compiled from code block A 102A and code block C 102C). Further, the covered code block list may comprise data identifying code block A 102A with a CBR of 0.2 and code block C 102C with a CBR of 0.8. From this, code coverage 116 may determine the TSR of test script A 108A to be the sum of code block A's 102A and code block C's 102C CBRs, or 1 (the sum of 0.2 and 0.8).

In an embodiment, at 308, testing framework 106 may run test scripts 108 according to the TSRs calculated for the test scripts. Running test scripts 108 according to the TSRs may allow the system to only run suggested test scripts that best cover the changes made to code blocks 102. By only running the test scripts that best cover the changes made, less resources of the system are used than if all the test scripts are run, resulting in less strain on the system. According to an embodiment, testing framework 104 may run test scripts 108 110 by running only the test script with the greatest TSR, running test scripts starting with the test script with the greatest TSR, running test scripts over a threshold TSR, not running test scripts below a threshold TSR, or any combination thereof—to name a few examples.

According to an embodiment, testing framework 104 may display data identifying each test script and each test script's respective TSR on display 114. The data may be displayed as a list, a table, a matrix, or any combination thereof—to name a few examples.

Figure 4A:
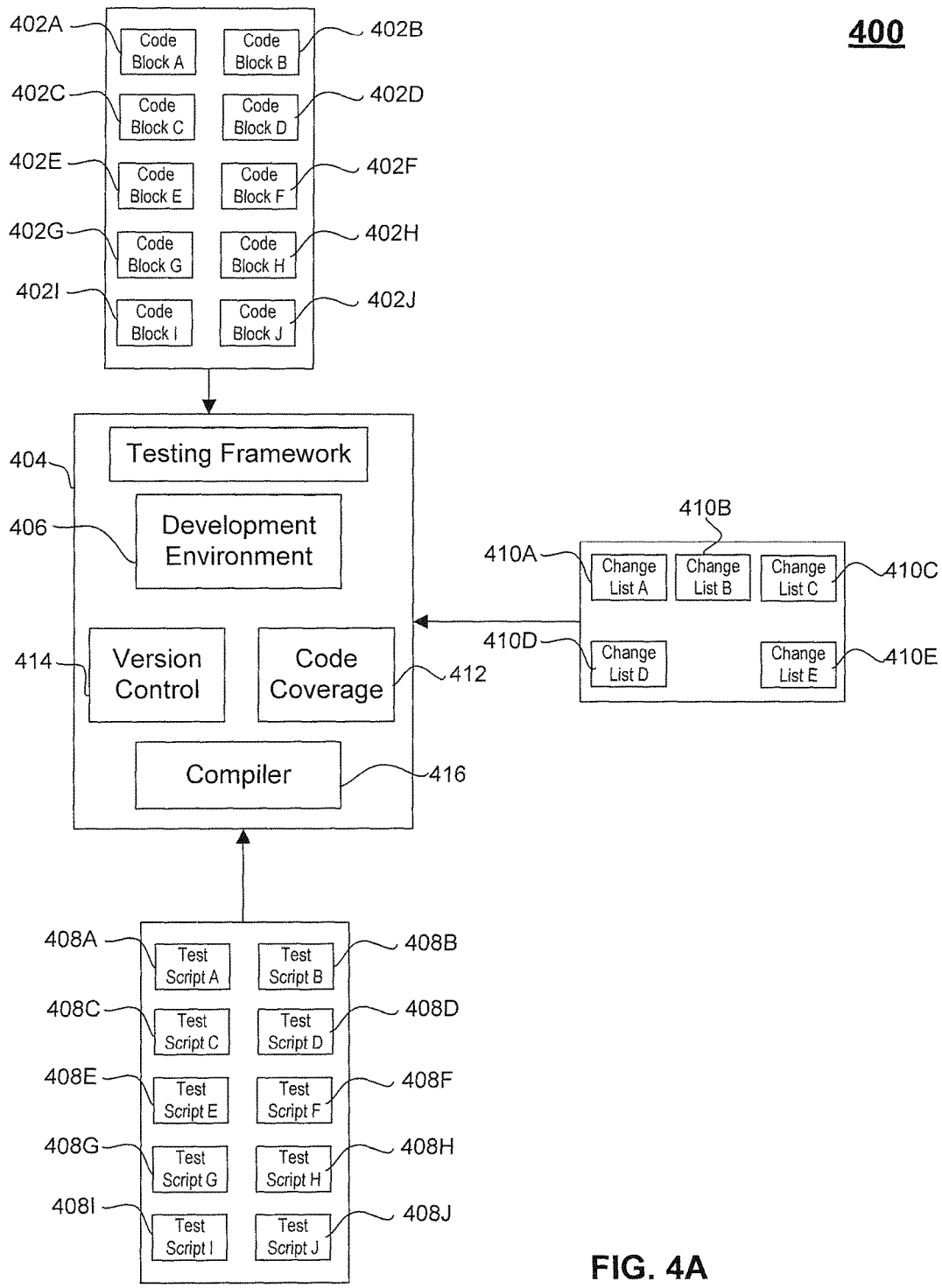
FIG. 4A is a case study for a process for change list debugging suggestion, according to an embodiment.

FIG. 4A is a case study for a process for change list debugging suggestion, according to an embodiment.

According to an embodiment, the system 400 may comprise code blocks 402 (comprising code blocks A-J 402A-J), testing framework 404, development environment 406, test scripts 408 (comprising test scripts A-J 408A-J), and change lists 410 (comprising change lists A-E 410A-E), code coverage 412, version control 420, and compiler 416.

In an embodiment, code coverage 412, which may comprise, for example, code coverage 116, may determine that compiled code compiled from code block A 402A is covered by 5 test scripts, compiled code compiled from code block B 402B is covered by 1 test script, compiled code compiled from code block C 402C is covered by 4 test scripts, compiled code compiled from code block D 402D is covered by 2 test scripts, compiled code compiled from code block E 402E is covered by 2 test scripts, compiled code compiled from code block F 402F is covered by 2 test scripts, compiled code compiled from code block G 402G is covered by 0 test scripts, compiled code compiled from code block H 402H is covered by 6 test scripts, compiled code compiled from code block I 402I is covered by 6 test scripts, and compiled code compiled from code block J 402 is covered by 4 test scripts.

Further, in an embodiment, code coverage 416 may receive a change list range input identifying change list A 410A and change list D 410D, creating a change list range of change list A 410A to change list D 410D. Code Coverage 416 may then determine that change list A 410A has modified code block A 402 A, code block D 402D, and code block J 402J; change list B 410B has modified code block A402A; change list C 410C has modified code block E 402E and code block J 402J; and change list D 410D has modified code block J 402J. According to an embodiment, code coverage 416 may record the code blocks modified by the change lists within the change list range (change lists A-D 410A-D) in a changed code block list.

According to an embodiment, code coverage 416 may then determine the CBR of each code block identified in the changed code block list in this case code block A 402A, code block D 402D, code block E 402, and code block J 402J. Code coverage 416 may use the equation identified in FIG. 2 to determine a CBR for code block A 402A of 0.2, code block D 402D of 0.5, code block E 402E of 0.5, and code block J 402J of 0.25.

In an embodiment, testing framework 404, which may comprise, for example, testing framework 104, may determine that test script A 408A, test script B 408B, and test script D 408D have all detected that compiled code compiled from code blocks 402 is not operating properly. Testing framework 404 may further determine that test script A 408A detected that compiled code compiled from code block A 402A and code block E 402E is not functioning properly, test script B 408B detected that compiled code compiled from code block A 402 is not functioning properly, and test script D 408D detected that compiled code compiled from code block E 402 and code block J 402J is not functioning properly. Code coverage 416 may record the test scripts and the respective code blocks compiled into malfunctioning compiled code in a test list. In an embodiment, code coverage 416 may determine the SCBR for each code block identified in the test list—in this case code block A 402A, code block. E 402E, and code block J 402J. Code coverage 416 may use the equation identified in FIG. 2 to determine a SCBR for code block A 402A of 0.4, code block E 402E of 1, and code block J 402J of 0.25.

According to an embodiment, code coverage 416 may then calculate a CLR for each change list within the change list range—in this case change list A 410A, change list B 410B, change list C 410C, and change list D 410D. Code coverage 416 may use the equation identified in FIG. 2 to determine a CLR for change list A 410A of 0.65, change list B 410B of 0.4, change list C 410C 1.25, and change list D 410D of 0.25. In an embodiment, code engine 406 may then run a debugging software on code blocks changed by change lists with a CLR greater than 0.5—in this case code blocks changed by change list A 410A and change list C 410C.

Figure 4B:
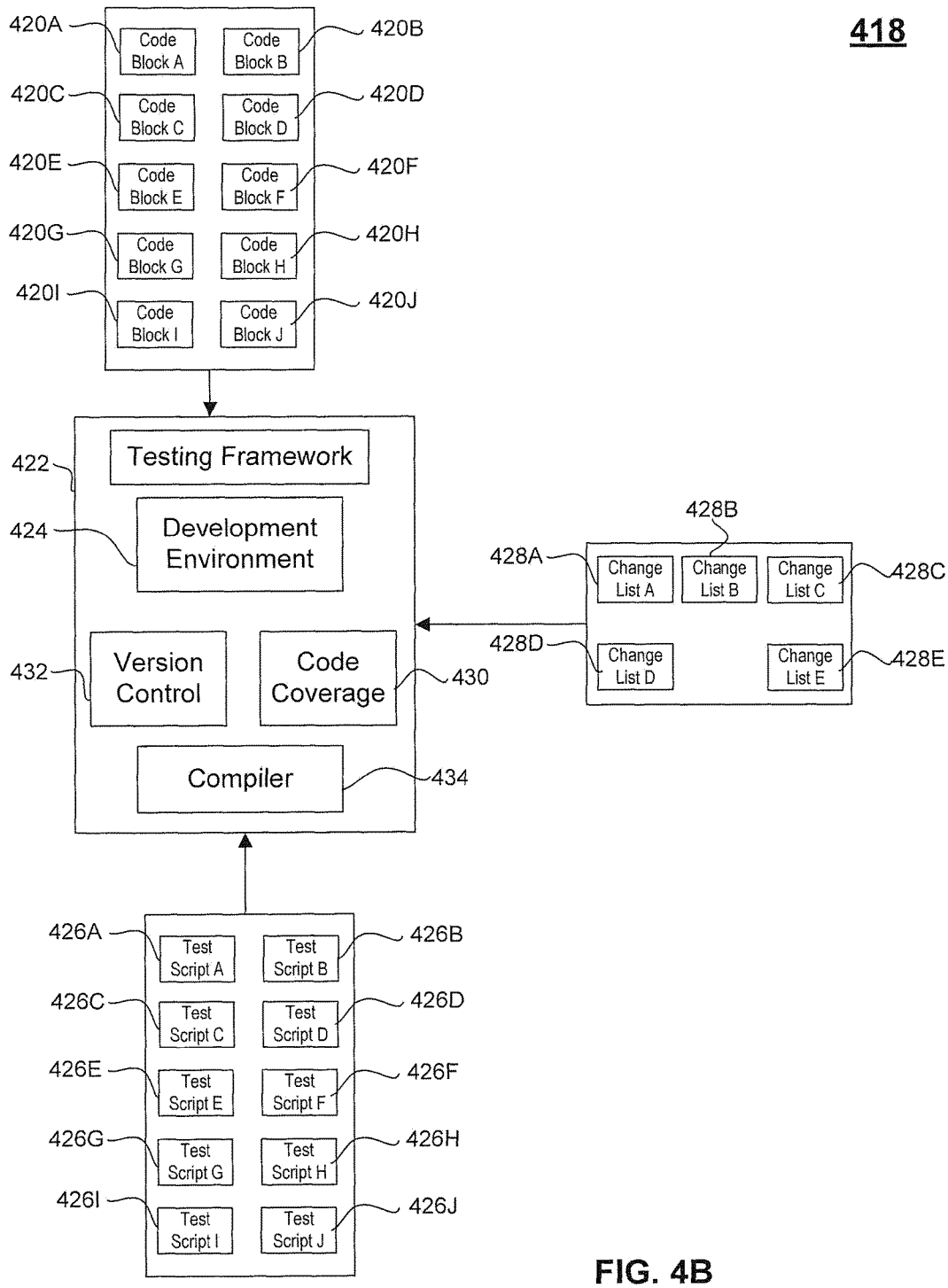
FIG. 4B is a case study for a process for test script suggestion, according to an embodiment.

FIG. 4B is a case study for a process for test script suggestion, according to an embodiment.

According to an embodiment, the system 418 may comprise code blocks 420 (comprising code blocks A-J 420A-J), testing framework 422, development environment 424, test scripts 426 (comprising test scripts A-J 426A-J), change lists 428 (comprising change lists A-E 428A-E), code coverage 430, version control 432, and compiler 434.

In an embodiment, code coverage 434, which may comprise, for example, code coverage 116, may determine that compiled code compiled from code block A 420A is covered by 5 test scripts, compiled code compiled from code block B 420B is covered by 1 test script, compiled code compiled from code block C 420C is covered by 4 test scripts, compiled code compiled from code block D 420D is covered by 2 test scripts, compiled code compiled from code block E 420E is covered by 2 test scripts, compiled code compiled from code block F 420F is covered by 2 test scripts, compiled code compiled from code block G 420G is covered by 0 test scripts, compiled code compiled from code block H 420H is covered by 6 test scripts, compiled code compiled from code block I 420I is covered by 6 test scripts, and compiled code compiled from code block J 420 is covered by 4 test scripts.

Further, in embodiment, code coverage 434 may receive a change list range input identifying change list A 428A and change list D 428D, creating a change list range of change list A 428A to change list D 428D. Code coverage 434 may then determine that change list A 428A has modified code block A 420 A, code block D 420D, and code block J 420J; change list B 428B has modified code block A 420A; change list C 428C has modified code block E 420E and code block J 420J; and change list D 428D has modified code block J 420J. According to an embodiment, code coverage 434 may record the code blocks modified by the change lists within the change list range (change lists A-D 428A-D) in a covered code block list.

According to an embodiment, code coverage 434 may then determine the CBR of each code block identified in the covered code block list—in this case code block A 420A, code block D 420D, code block E 420E, and code block J 420J. Code coverage 434 may use the equation identified in FIG. 2 to determine a CBR for code block A 420A of 0.2, code block D 420D of 0.5, code block E 420E of 0.5, and code block J 420J of 0.25.

In an embodiment, test scripts 426 may comprise test script A 426A, comprising a set of instructions for compiled code compiled from code block A 420A, code block E 420E, and code block H 420H; test script B 426B comprising a set of instructions for compiled code compiled from code block A 420A and code block H 420H; test script C 426C comprising a set of instructions for compiled code compiled from code block B 420B, code block D 420D, code block F 420F, and code block J 420J; test script D 426D comprising a set of instructions for compiled code compiled from code block C 420C, code block E 420E, code block I 420I, and code block J 420J; test script E 426E comprising a set of instructions for compiled code compiled from code block A 420A, code block C 420C, code block H 420H, and code block I 420I; test script F 426F comprising a set of instructions for compiled code compiled from code block C 420C, code block H 420H, and code block I 420I; test script G 426G comprising a set of instructions for compiled code compiled from code block H 420H, code block I 420I, and code block J 420J; test script H 426 H comprising a set of instructions for compiled code compiled from code block A 420A, code block D 420D, code block I 420I, and code block J 420J; test script I 426I comprising a set of instructions for compiled code compiled from code block C 420C and code block H 420H; and test script J 426J comprising a set of instructions for compiled code compiled from code block A 420A, code block H 420H, and code block I 420I.

According to an embodiment, code coverage 434 may then determine the TSR of each test script that covers compiled code compiled from a code block identified in the covered code block list—in this case test script A 426A, test script B 426B, test script C 426C, test script D 426D, test script E 426E, test script G 426G, test script H 426H, and test script J 426J. Code coverage 434 may use the equation identified in FIG. 3 to determine a TSR for test script A 426 A of 0.7, test script B 426B of 0.2, test script C 426C of 0.75, test script D 426D of 0.75, test script E 426E of 0.2, test script G 426G of 0.25, test script H 426H of 0.95, and test script J 426J of 0.2.

In an embodiment, testing framework 416 may then run test scripts with a TSR great than 0.7—in this case test script C 426C, test script D 426D, and test script H 426H.

Figure 5:
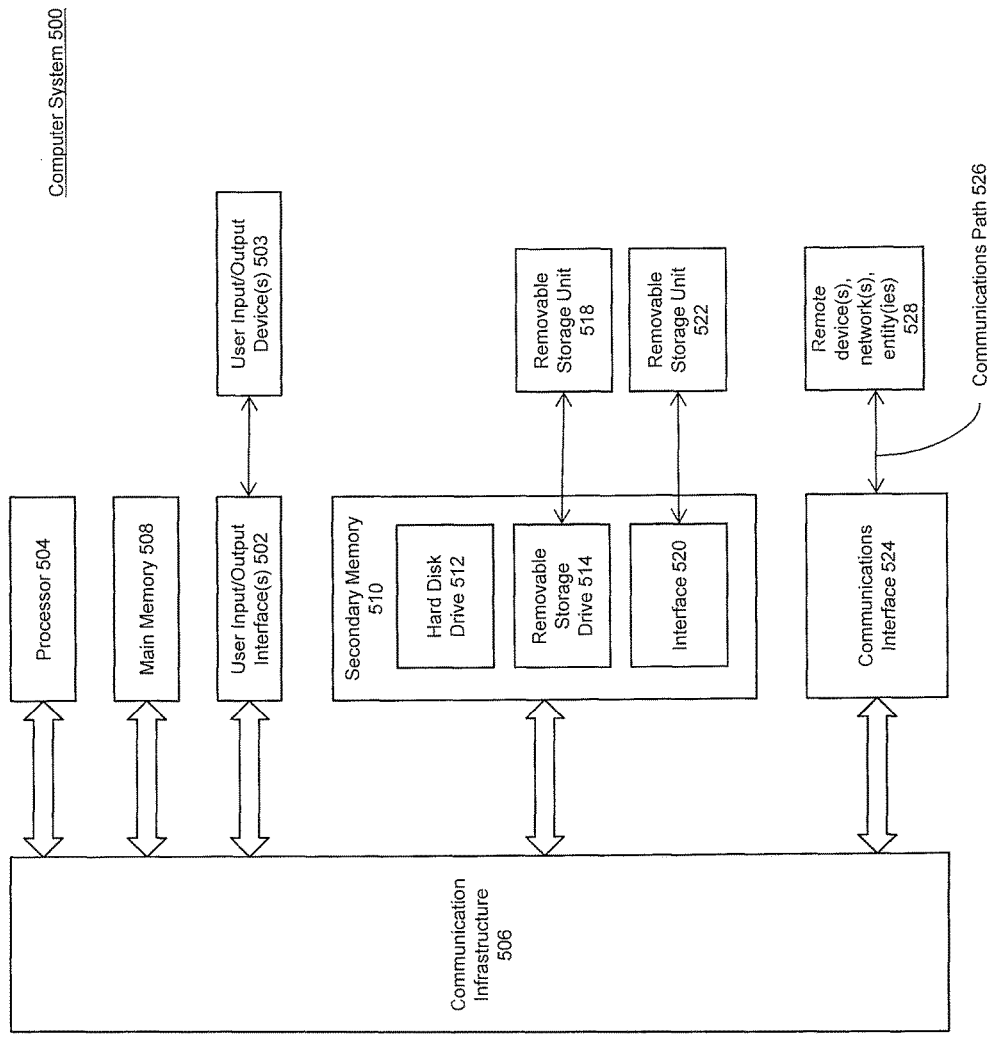
FIG. 5 is an example computer system useful for implementing various embodiments.

Various embodiments can be implemented, for example, using one or more well-known computer systems, such as computer system 500 shown in FIG. 5.

For example, computer system 500 can assign and calculate ratings to various code blocks, change lists, and test scripts. Computer system 500 can further run tests scripts according the various ratings calculated and assigned. Computer system 500 can be any computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 608 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 5. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, blocks, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method, comprising:
    assigning, by at least one processor, a respective code block rating to each code block of a plurality of code blocks, wherein the respective code block rating of a code block is based upon a quantity of test scripts covering the code block;
    determining, by at least one processor, a change list rating for a change list, wherein the determining comprises:
        assigning, by at least one processor, a respective suspicious code block rating to each code block of the plurality of the code blocks that have been modified by the change list, wherein the respective suspicious code block rating of a code block is based upon the respective code block rating of the code block, and
        calculating, by at least one processor, the change list rating based upon the respective suspicious code block ratings of each code block modified by the change list; and
    performing, by at least one processor, maintenance on a code block of the plurality of code blocks that has been modified by the change list based upon the calculated change list rating.

2. The method of claim 1, wherein the respective suspicious code block rating of a code block is further based upon a quantity of test scripts that detected a malfunction in code compiled from the code block.

3. The method of claim 1, further comprising:
    receiving, by at least one processor, a change list range input; and
    creating, by at least one processor, a change list range from a plurality of change lists based upon the change list range input.

4. The method of claim 3, wherein the change list is within the change list range.

5. The method of claim 4, wherein the performing, by at least one processor, maintenance on the code block of the plurality of code blocks that has been modified by the change based upon the respective change list rating further comprises:
    comparing, by at least one processor, the change list rating to a threshold value; and
    performing, by at least one processor, maintenance on the code block of the plurality of code blocks that has been modified by the change list based upon the comparison of the change list rating to the threshold value.

6. The method of claim 1, the calculating, by at least one processor, the change list rating based upon the respective suspicious code block ratings of each code block modified by the change list further comprising:
    summing, by at least one processor, the respective suspicious code block ratings of each code block of the plurality of code blocks modified by the change list.

7. A system, comprising:
    a memory;
    and at least one processor coupled to the memory and configured to:
        assign a respective code block rating to each code block of a plurality of code blocks, wherein the respective code block rating of a code block is based upon a quantity of test scripts covering the code block;

determine a change list rating for a change list, wherein the processor that determines is configured to:
  assign a respective suspicious code block rating to each code block of the plurality of the code blocks that have been modified by the change list, wherein the respective suspicious code block rating of a code block is based upon the respective code block rating of the code block, and
  calculate the change list rating based upon the respective suspicious code block ratings of each code block modified by the change list; and
perform maintenance on a code block of the plurality of code blocks that has been modified by the change list based upon the calculated change list rating.

8. The system of claim 7, wherein the at least one processor is configured to determine coverage of a test script over the plurality of code blocks.

9. The system of claim 8, wherein the at least one processor is configured to calculate a test script rating for the test script based upon the respective code block rating of each code block of the plurality of code blocks covered by the test script.

10. The system of claim 7, the at least one processor configured to calculate, further configured to:
  sum the respective code block ratings of each code block covered by the test script.

11. The system of claim 8, wherein the at least one processor further configured to:
  compare the calculated test script rating to a threshold value.

12. The system on claim 7, wherein each respective code block rating is based upon a relationship between a respective code block and a plurality of test scripts.

13. A tangible, non-transitory computer-readable device having instructions stored thereon that, when executed by at least one computing device, causes the at least one computing device to perform operations comprising:
  assigning a respective code block rating to each code block of a plurality of code blocks, wherein the respective code block rating of a code block is based upon a quantity of test scripts covering the code block;
  determining a change list rating for a change list, wherein the determining comprises:
    assigning a respective suspicious code block rating to each code block of the plurality of the code blocks modified by the change list, wherein the respective suspicious code block rating of a code block is based upon the respective code block rating of the code block, and
    calculating the change list rating based upon the respective suspicious code block ratings of each code block modified by the change list; and
  performing maintenance on a code block of the plurality of code blocks that has been modified by the change based upon the calculated change list rating.

14. The non-transitory computer-readable device of claim 13, wherein the respective suspicious code block rating of a code block is further based upon a quantity of test scripts that detected a malfunction in code compiled from the code block.

15. The non-transitory computer-readable device of claim 13, the operations further comprising:
  receiving, by at least one processor, a change list range input; and
  creating, by at least one processor, a change list range from a plurality of change lists based upon the change list range input.

16. The non-transitory computer-readable device of claim 15, wherein the change list is within the change list range.

17. The non-transitory computer-readable device of claim 16, wherein the performing maintenance on the code block of the plurality of code blocks that has been modified by the change based upon the respective change list rating further comprises:
  comparing, by at least one processor, the change list rating to a threshold value; and
  performing, by at least one processor, maintenance on code block of the plurality of code blocks that has been modified by the change based upon the comparison of the change list rating to the threshold value.

18. The non-transitory computer-readable device of claim 13, the calculating the change list rating based upon the respective suspicious code block ratings of each code block modified by the change list further comprising:
  summing, by at least one processor, the respective suspicious code block ratings of each code block of the plurality of code blocks modified by the change list.

* * * * *